United States Patent
Patel et al.

(10) Patent No.: US 12,356,298 B2
(45) Date of Patent: Jul. 8, 2025

(54) VOICE SURVEILLANCE SYSTEM USING ENHANCED METADATA AND GEOTAGGING CAPABILITIES

(71) Applicant: Bank of America Corporation, Charlotte, NC (US)

(72) Inventors: Vinesh Patel, London (GB); Michael Young, Davidson, NC (US)

(73) Assignee: Bank of America Corporation, Charlotte, NC (US)

( * ) Notice: Subject to any disclaimer, the term of this patent is extended or adjusted under 35 U.S.C. 154(b) by 506 days.

(21) Appl. No.: 17/984,319

(22) Filed: Nov. 10, 2022

(65) Prior Publication Data

US 2024/0163648 A1    May 16, 2024

(51) Int. Cl.
| | |
|---|---|
| *G06K 19/07* | (2006.01) |
| *H04L 41/046* | (2022.01) |
| *H04L 43/04* | (2022.01) |
| *H04L 67/303* | (2022.01) |
| *H04W 4/50* | (2018.01) |
| *H04W 4/80* | (2018.01) |

(52) U.S. Cl.
CPC .......... *H04W 4/50* (2018.02); *G06K 19/0719* (2013.01); *H04L 41/046* (2013.01); *H04L 43/04* (2013.01); *H04L 67/303* (2013.01); *H04W 4/80* (2018.02)

(58) Field of Classification Search
CPC ...... H04W 4/50; H04W 4/80; G06K 19/0719; H04L 41/046; H04L 43/04; H04L 67/303
See application file for complete search history.

(56) References Cited

U.S. PATENT DOCUMENTS

| | | | |
|---|---|---|---|
| 2011/0002480 A1* | 1/2011 | Smith | H04M 1/72457 381/104 |
| 2012/0274595 A1* | 11/2012 | Lee | H04M 1/0237 345/173 |
| 2018/0152672 A1* | 5/2018 | Garrett | H04N 7/18 |
| 2019/0044963 A1* | 2/2019 | Rajasekharan | H04W 12/67 |
| 2019/0356679 A1* | 11/2019 | Sites | H04L 63/1416 |
| 2020/0204574 A1* | 6/2020 | Christian | G06F 18/23 |
| 2021/0209388 A1* | 7/2021 | Ciftci | G06N 3/045 |

(Continued)

*Primary Examiner* — Chris Parry
*Assistant Examiner* — Hassan Abdur-Rahman Khan
(74) *Attorney, Agent, or Firm* — Weiss & Arons LLP

(57) ABSTRACT

Apparatus, methods and systems for voice surveillance using enhanced metadata and geotagging capabilities are provided. Systems may monitor communications being transmitted from, and being received at, entity devices. The communications may be monitored for anomalies. The anomalies may be identified as communications outside of a regular pattern of communications. Various factors may be used to identify the anomalous communications. The factors may include a number of communications per predetermined time period, a geolocation of the communication, identification of a second communicative party of the communication and any other suitable factors. Stakeholders may be alerted regarding any anomalous communications. Additionally, once the communications have been labeled as anomalous or non-anomalous, the labeled communications may be used to create and/or update a set of labeled training data. The created and/or updated set of labeled training data may be used in an artificial intelligence engine that labels communications as anomalous or non-anomalous.

18 Claims, 3 Drawing Sheets

(56) References Cited

U.S. PATENT DOCUMENTS

| | | | |
|---|---|---|---|
| 2021/0273953 A1* | 9/2021 | Fellows | G06F 21/554 |
| 2021/0360015 A1* | 11/2021 | Mammadli | H04L 63/1466 |
| 2022/0058262 A1* | 2/2022 | Tikhomirov | G06N 20/00 |
| 2022/0172010 A1* | 6/2022 | Pese | G06F 18/25 |
| 2022/0174511 A1* | 6/2022 | Kvernvik | H04B 17/318 |
| 2022/0225101 A1* | 7/2022 | Fellows | H04L 41/16 |
| 2022/0256333 A1* | 8/2022 | Whyte | H04W 12/121 |
| 2023/0097884 A1* | 3/2023 | Walther | G06F 21/552 |
| | | | 726/26 |
| 2023/0216746 A1* | 7/2023 | Ucci | G06N 7/01 |
| | | | 709/224 |

\* cited by examiner

VOICE SURVEILLANCE SYSTEM USING ENHANCED METADATA AND GEOTAGGING CAPABILITIES

FIELD OF TECHNOLOGY

Aspects of the disclosure relate to surveillance systems for mobile devices.

BACKGROUND OF THE DISCLOSURE

There are times when entity mobile devices are used by employees for malicious purposes. In order to monitor location and usage of employee mobile devices, an entity may want to obtain information relating to the mobile devices used by the employees for malicious purposes. Using a human operator to record and review each communication that occurs on each entity mobile device may not be practical because of the volume of devices associated with an entity as well as the volume of communications that occur within an entity's fleet of mobile devices.

As such, it may be desirable to create a mobile device surveillance application. It would be further desirable for the surveillance application to be installed on each of the entity's mobile devices.

It would be yet further desirable for the surveillance application to communicate with a central server. It would be still further desirable for the surveillance applications in communication with the central server to execute an artificial intelligence ("AI") application.

It would be yet further desirable for the artificial intelligence application to identify anomalous communications from among all of the communications. The anomalous communications may be indicative of communications of malicious intent.

SUMMARY OF THE DISCLOSURE

A communication surveillance system is provided. The communication surveillance system may include a central server. The central server may include one or more hardware processors, one or more hardware memory devices and any other suitable hardware and/or software computer elements. The communication surveillance system may also include a plurality of surveillance applications. The surveillance applications may execute on one or more hardware processors and/or one or more hardware memory devices and/or any other suitable hardware and/or software computer elements. The communication surveillance system may enable a predetermined entity to monitor communications being transmitted from, and being received at, each of a plurality of mobile devices.

Each surveillance application, included in the plurality of surveillance applications, may execute on a mobile device. The mobile device may be included in a plurality of mobile devices. The mobile devices may be associated with, owned by or linked to the predetermined entity.

Each surveillance application may detect one or more communications occurring on the mobile device. Examples of communications may include voice calls, voice messages, emails, chats, short messaging service ("SMS"), multimedia messaging service ("MMS") and any other suitable communications.

The one or more communications may be logged by the surveillance application. The logging may be executed upon completion of the communication. The logging may be executed at the initiation of the communication. The logging may be executed during the communication.

At times, the logging may include generating a metadata log file for each communication. The metadata log file may include a date time stamp of the communication. The metadata log file may include a duration of the communication. The metadata log file may include a second communicative party with which the mobile device interacted. The second communicative party may be identified using a telephone number, internet protocol ("IP") address, virtual private network ("VPN") number and/or any other suitable identification method for a device being used by the second communicative party.

The metadata log file may also include a location of the device. The location of the device may be identified based on a global positioning system ("GPS") application executing on the mobile device. Because a mobile device user may attempt to change the GPS location identified by the mobile device, there may be additional methods for identifying the location of the device.

The location of the device may also be identified based on a proximity between the mobile device a Wi-Fi tower identified within a predetermined time window from the time stamp. It should be noted that the predetermined time window may be a reasonable time window that the mobile device was at the specific location. The predetermined time window may be one minute, one hour, one day or other suitable time window. At times, the Wi-Fi tower may be in communication with the central server. Other times, the mobile device and/or the surveillance application, may log, with a time stamp, each time the mobile device came into a predetermined proximity with the Wi-Fi tower.

The location of the device may also be identified based on a proximity between the mobile device and a cell tower identified within the predetermined time window from the date time stamp. At times, the cell tower may be in communication with the central server. Other times, the mobile device and/or the surveillance application, may log, with a time stamp, each time the mobile device came into a predetermined proximity with a cell tower.

The location of the device may also be identified based on a proximity between the mobile device and other mobile devices within a network within the predetermined time window from the date time stamp. Because an entity may own and/or be associated with a plurality of mobile devices. The surveillance application may identify other mobile devices in a vicinity of the mobile device and receive the location information of the other identified mobile devices.

The location of the device may also be identified based on a near field communication ("NFC") communication log. The NFC communication log may indicate communication, within the predetermined time window, between an NFC application and an NFC receiver. The NFC application and/or the NFC communication log may be resident on the mobile device. The NFC receiver may be located at a point-of-sale location, such a brick-and-mortar store or any other suitable location.

Each NFC receiver may be associated with an identifier. Each identifier may be associated with a predetermined location. As such, the location of the mobile device may be identified based on the location of the NFC receiver.

The location of the device may also be identified based on a Bluetooth® communication log. The Bluetooth® communication log may indicate a communication, within the predetermined time window, between a Bluetooth® application resident on the mobile device and a second Bluetooth® application. The second Bluetooth® application may be resident on a second device. The second device may be executing a GPS application. As such, the location of the mobile device may be identified based on the identified location of the second device executing the second Bluetooth® application.

The metadata log file may also include a type of communication. Examples of types of communications may include voice calls, voice messages, emails, chats, short messaging service ("SMS"), multimedia messaging service ("MMS") and any other suitable type of communication.

The metadata log file may also include data relating to the mobile device. Such data may include a name of a person in possession of, or otherwise associated with, the mobile device and a phone number of the mobile device.

An example of a metadata log file may be shown below:
A. Mobile device number 000.000.0000
B. Personnel Name John Doe
C. Telephone Call
D. 10:30 AM Eastern Standard Time
E. Duration: 45 seconds
F. GPS coordinates: N00.00.000 W000.00.000
G. Communicated with: Phone Number: 111.111.1111

Upon generation of one or more metadata log files, the one or more metadata log files may be transmitted to the central server. The central server may receive the one or more metadata log files from one or more surveillance applications included in the plurality of surveillance applications.

The central server may also receive a set of input parameters. The set of input parameters may include a plurality of predetermined geographic locations and perimeters to the plurality of geographic locations. The predetermined geographic locations may include locations of high sensitivity, for example, a location within a predetermined proximity to a government building.

The set of input parameters may also include a plurality of second communicative parties. The plurality of second communicative parties may be identified using a plurality of telephone numbers, one or more IP addresses, one or more VPN numbers or any other suitable identification method.

The set of input parameters may also include a plurality of entity hour-based time windows. The plurality of entity hour-based time windows may be time frames may include a set of office hours and a set of out of office hours. For example, 8:00 AM to 6:00 PM may be considered office hours and 6:00 PM to 8:00 AM may be considered out of office hours.

The set of input parameters may also include a plurality of entity date-based time windows. The plurality of entity date-based time windows may be time frames of in office days and vacation days. The time windows may be global to the entity, such as legal holidays and workdays. The time windows may be specific to the individual. Such as personal days and workdays. Additionally, in certain environments with certain types of occupations, there may be regulation requiring a mandatory number of consecutive vacation days. As such, in the event that a mobile device, linked to the entity (as opposed to a personal device) is being used during the required vacation days, there may be a suspected violation.

It should be noted that that the input parameters may be tunable and/or dynamically adjusted for each mobile device. As such, a first mobile device may be associated with office hours of 10:00 AM to 6:00 PM and a second mobile device may be associated with office hours of 7:00 AM to 3:00 PM. Additionally, an artificially-intelligent module, which may be integrated with the surveillance application and/or the central server, may identify anomalies based on a mobile device user's past experience.

Upon receipt of the metadata log files and the input parameters, the central server, using artificial intelligence, may generate a baseline. The central server may implement an artificial intelligence module to generate the baseline. The artificial intelligence module may utilize historic communications, the received metadata log files and the input parameters to generate the baseline. The baseline may identify communications as anomalous or non-anomalous based on previously labeled training data—e.g., historic or training communications that have been previously labeled anomalous or non-anomalous.

The baseline may be general for mobile device users. The baseline may be specific to one mobile device user. The baseline may be specific to a person. The baseline may be specific to a line of business users. The line of business users may be a subset of the mobile device users. The baseline may be stored at the central server. The baseline may be stored on the surveillance applications. In the event that the baseline is specific to a mobile device user or a subset of mobile device user, the baseline may be stored on the corresponding mobile device(s).

The central server may continually receive metadata log files from the plurality of surveillance applications. The central server may identify a metadata log file as an anomalous communication or a non-anomalous communication. The central server may determine that a metadata log file is an anomalous communication.

The central server may also continually receive a plurality of metadata log files from the plurality of surveillance applications. The central server may periodically receive a plurality of metadata log files from the plurality of surveillance applications. The periodic communications may be transmitted from the surveillance application to the central in a batch mode.

At times, when a mobile device is unable to communicate with the central server, the mobile device may store the metadata log files until the communication between the mobile device and the central server has been reestablished. Upon reestablishment of the connection, the surveillance application may transmit the metadata log files to the central server.

The central server may determine that a subset of the plurality of metadata log files is a group of anomalous communications. The central server may transmit an alert to one or more stakeholders relating to, and including, the identified anomalous communication and/or group of anomalous communication. At times, the central server may identify an irregular metadata log file within the subset of the plurality of metadata log files. The irregular metadata log file may be associated with a higher irregularity level than the remainder of the subset of the plurality of metadata log files. The irregular metadata log file may be flagged as highly irregular when being transmitted to the one or more stakeholders.

The central server may continually update the baseline with the continually received metadata log files. As the central server receives metadata log files and labels the metadata log files as anomalous or non-anomalous, the baseline may be updated to include the labeled metadata log files. As such, the central server may push the updated baseline to the appropriate mobile devices and surveillance applications.

At times, the metadata log file may include a transcription of the communication. At other times, the metadata log file may include metadata relating to the communication. It should be noted that, in the event that the metadata log file is generated upon initiation of the communication and transmitted to the central server, and the communication is determined by the central server to be anomalous, the central server may instruct the surveillance application to transcribe such a communication.

Additionally, at times, the surveillance application may store a profile relating to the mobile device user. As such, in the event that a communication is initiated and detected by the surveillance application as anomalous, the surveillance application may transcribe the communication. The transcription of the communication may be used to determine whether or not the communication was indeed anomalous.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
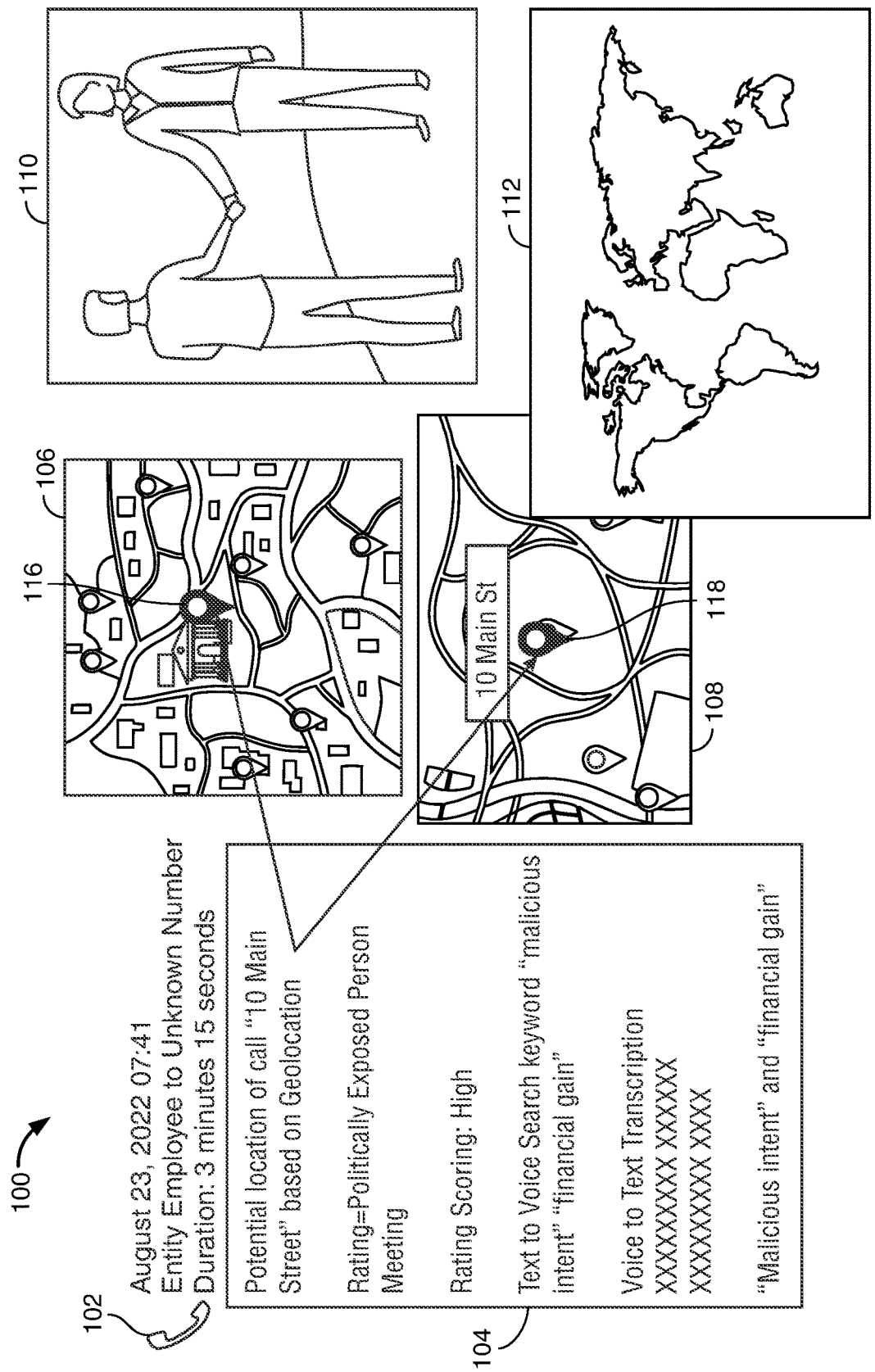
FIG. 1 shows an illustrative diagram in accordance with principles of the disclosure.

Apparatus and methods for a voice surveillance system using enhanced metadata and geotagging capabilities may be provided.

A method for identifying one or more anomalous communications within an entity may be provided. The method may include creating a profile for each of a plurality of entity devices. The profile may include a linked individual.

The profile may also include a plurality of details relating to the linked individual. The plurality of details may include an occupation associated with the linked individual. The plurality of details may also include a set of office hours associated with the linked individual. The set of office hours may be office hours in which the linked individual is at the office more than a predetermined number of days per week and/or per year.

The plurality of details may also include a set of mandatory vacation days associated with the linked individual. The plurality of details may also include one or more geographic office and/or home locations associated with the linked individual.

The plurality of details may also include a predetermined number of each of a predetermined category of communications transmitted by the individual. The predetermined category of communications may include email, chat, SMS, MMS, voice call and voice message.

The method may include surveilling the plurality of entity devices for a plurality of communications being transmitted from, and received at, each entity device included in the plurality of entity devices. The method may include continually updating the profile for each of the plurality of entity devices based on the communications being transmitted from, and received at, each entity device.

The method may include identifying one or more anomalous communications included in the plurality of communications. The identifying may be based on an artificially intelligent anomalous detection. The artificially intelligent anomalous detection may compare a set of metadata of one or more anomalous communication to the plurality of communication and the profile. The set of metadata may include a date time stamp of the communication, a location of the communication and/or a second communicative party with which the entity device interacted.

The method may include transmitting an alert to one or more stakeholders. The alert comprising the one or more anomalous communications.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows illustrative diagram 100. Illustrative diagram 100 may show communication that may be monitored by a surveillance application executing on a mobile device.

The surveillance application may obtain metadata relating to the communication, as shown at 102. The metadata may indicate a type of communication (phone call indicated by telephone icon), a date time stamp of the communication (Aug. 23, 3033 07:41), the parties involved in the communication (the entity employee and the unknown number), which party initiated the communication (the entity employee) and the duration of the communication (3 minutes and 15 seconds).

Additional metadata relating to the contents of the communication may be shown at 104. The potential location of the call may be 10 Main Street. The geographic location may be based on three different identifiers. A first identifier may show the communication occurring at location 116 within map 106. Location 116, within map 106, may be identified using a GPS location resident on the device. A second identifier may show the communication occurring at location 118 within map 108. Location 118, within map 108, may be identified using a recorded proximity to a cell tower within the duration of the communication. A third identifier may show the communication occurring at a location within map 112. The location within map 112 may be identified using a recorded proximity to a Wi-Fi hotspot. The first identifier, second identifier and third identifier may indicate the same location within a predetermined range, such as 300 feet radius. The location may have a higher-than-normal rating.

Examples of locations with a higher-than-normal rating may include a governmental official office, a governmental official home address, a private location of an entity (when the employee is a public-side employee), a public location of an entity (when the employee is a private-side employee), a low-cost geographic location (when the employee is responsible for work that is supposed to be completed in a high-cost geographic location) and a geographic location associated with financial report release (when the employee is an administrative employee and the time of the communication is directly prior to release of financial report).

Additionally, a different source, such as a photograph posted to an internet location, may indicate that that entity employee was seen shaking hands with a political figure during a time period adjacent to the communication. Photograph 110, which may have been posted to an internet location, shows a photograph of the entity employee shaking hands with the political figure.

The additional data may also include a rating of the communication. The communication may be rated based on various factors, such as occupation level of employee, geographical location of employee and any other suitable factors. As such, the rate scoring of the communication may be high.

The additional data may also include a transcription of the communication. A transcription of the communication may be initiated when a rate scoring of the communication is above a predetermined threshold. The transcription may indicate that keywords associated with a greater than normal rate scoring have been identified. These keywords may include malicious intent and financial gain.

Figure 2:
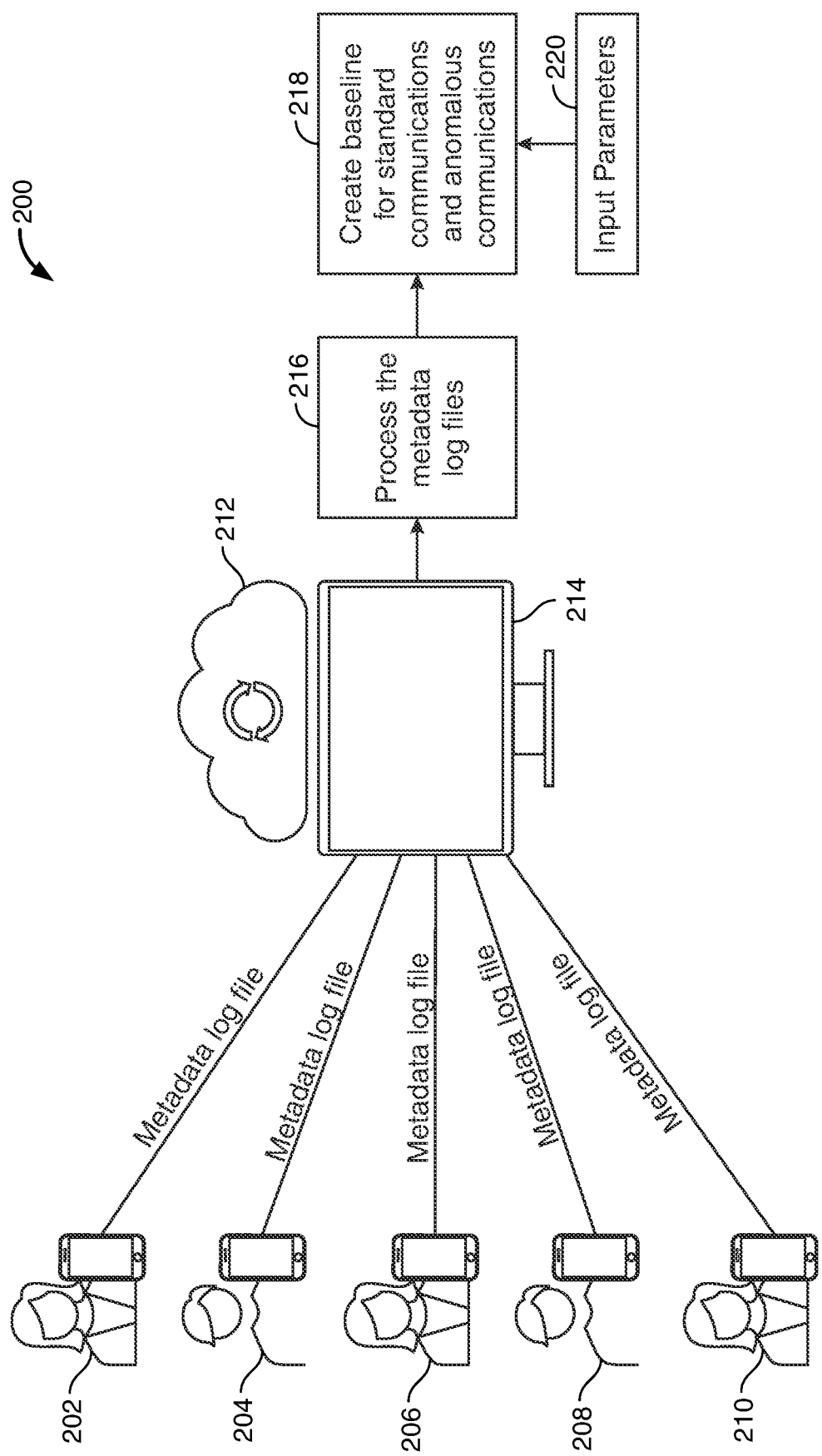
FIG. 2 shows another illustrative diagram in accordance with principles of the disclosure.

FIG. 2 shows illustrative diagram 200. Employees 202, 204, 206, 208 and 210 may be associated with a plurality of entity devices. Each of the entity devices may process one or more communications.

Each of the communications may be logged by a surveillance application operating on the entity devices. The log of the communications may be identified as metadata log files. Each metadata log file may be transmitted via a network, such as network 212, to central server 214. Central server 214 may process the metadata log files, as indicated at 216. Central server may receive a plurality of input parameters, as shown at 220. Central server 214 may create a baseline for standard communications and anomalous communications, as shown at 218.

Figure 3:
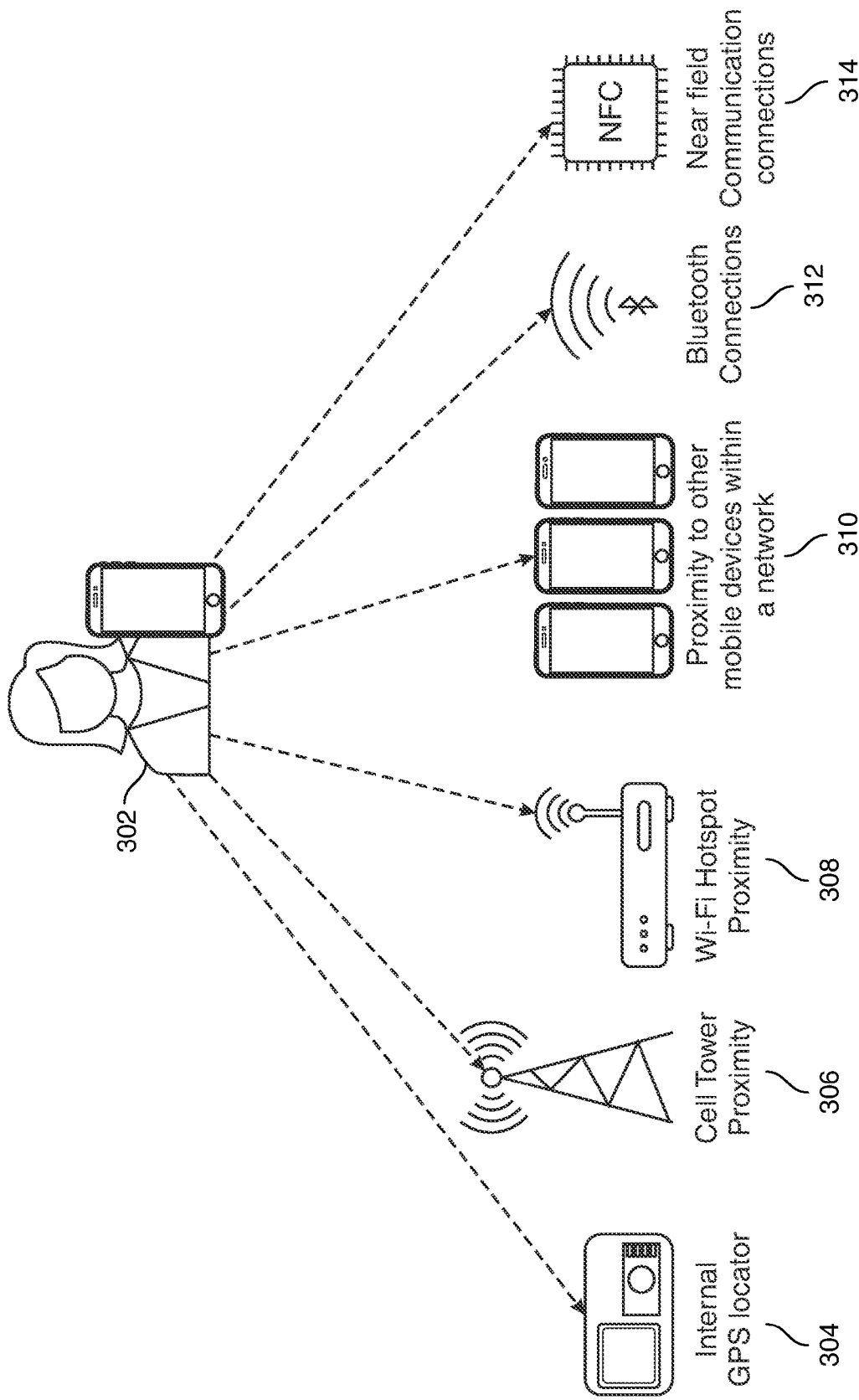
FIG. 3 shows yet another illustrative diagram in accordance with principles of the disclosure.

FIG. 3 shows illustrative diagram 300. Employee 302 may be associated with a mobile device. There may be various sources for determining a geographical positioning for a mobile device. The source may include an internal GPS locator, shown at 304, a cell tower proximity, shown at 306, a Wi-Fi hotspot proximity, shown at 308, a proximity to other devices within a network, shown at 310, Bluetooth® connections, shown at 312 and NFC connections, shown at 314.

Thus, systems and methods for a voice surveillance system using enhanced metadata and geotagging capabilities are provided. Persons skilled in the art will appreciate that the present invention can be practiced by other than the described embodiments, which are presented for purposes of illustration rather than of limitation. The present invention is limited only by the claims that follow.

What is claimed is:

1. A communication surveillance system comprising:
a central server; and
a plurality of surveillance applications, each surveillance application included in the plurality of surveillance applications executing on a mobile device included in a plurality of mobile devices, each surveillance application operable to:
detect one or more communications occurring on the mobile device;
upon completion of each of the one or more communications, generate a metadata log file for each of the one or more communications, said metadata log file comprising:
a date time stamp of the communication;
a location of the communication; and
a second communicative party with which the mobile device interacted; and
transmit the generated metadata log file to the central server;
the central server operable to:
receive the metadata log file from a surveillance application included in the plurality of surveillance applications;
receive a set of input parameters; and
generate, using artificial intelligence ("AI"), a baseline to determine anomalous and non- anomalous communications based on the received metadata log file and the input parameters;
wherein a location of the mobile device is identified based on:
a global positioning system ("GPS") application executing on the mobile device;
a proximity between the mobile device and a Wi-Fi tower identified within a predetermined time window from the date time stamp;
a proximity between the mobile device and a cell tower identified within the predetermined time window from the date time stamp;
a proximity between the mobile device and other mobile devices within a network identified within the predetermined time window from the date time stamp;
a near field communication ("NFC") communication log indicating a communication, within the predetermined time window, between an NFC application, resident on the mobile device, and an NFC receiver; and
a Bluetooth® communication log indicating a communication, within the predetermined time window, between a Bluetooth® application, resident on the mobile device, and a second Bluetooth® application.

2. The communication surveillance system of claim 1, the central server further operable to:
continually receive metadata log files from the plurality of surveillance applications;
determine that a metadata log file, included in the metadata log files, is an anomalous communication; and
transmit an alert to one or more stakeholders, said alert comprising the anomalous communication.

3. The communication surveillance system of claim 2, the central server further operable to continually update the baseline with the continually received metadata log files.

4. The communication surveillance system of claim 1, the central server further operable to:
continually receive a plurality of metadata log files from the plurality of surveillance applications;
determine that a subset of the plurality of metadata log files is a group of anomalous communications; and
transmit an alert to one or more stakeholders, said alert comprising the group of anomalous communications.

5. The communication surveillance system of claim 1, wherein the metadata log file further comprises a type of communication.

6. The communication surveillance system of claim 5, wherein the type of communication is email, chat, short messaging service ("SMS"), multimedia messaging service ("MMS"), voice call or a voice message.

7. The communication surveillance system of claim 4, wherein the central server is further operable to identify an irregular metadata log file, within the subset of the plurality of metadata log files, said irregular metadata log file that is associated with a higher irregularity level than a remainder of the subset of the plurality of metadata log files.

8. The communication surveillance system of claim 1, wherein the location of the mobile device is identified based on a location of the NFC receiver.

9. The communication surveillance system of claim 1, wherein the location of the mobile device is identified based on a location of a device executing the second Bluetooth® application.

10. The communication surveillance system of claim 1, wherein the input parameters comprise:
a plurality of predetermined geographic locations and perimeters to the plurality of geographic locations;
a plurality of second communicative parties;
a plurality of entity hour-based time windows; and
a plurality of entity date-based time windows.

11. A method for identifying one or more anomalous communications within an entity, the method comprising:
creating a profile for each of a plurality of entity mobile devices, said profile comprising:
a linked individual;
a location; and
a plurality of details relating to the linked individual;
surveilling the plurality of entity mobile devices for a plurality of communications being transmitted from, and received at, each entity mobile device included in the plurality of entity mobile devices;
continually updating the profile for each of the plurality of entity mobile devices based on the communications being transmitted from, and received at, each entity mobile device;
identifying one or more anomalous communications included in the plurality communications, said identifying being based on an artificially intelligent anomalous detection, said artificially intelligent anomalous detection comparing a set of metadata of one or more anomalous communications to the plurality of communications and the profile; and
transmitting an alert to one or more stakeholders, said alert comprising the one or more anomalous communications;
wherein the location of the entity mobile device is identified based on:
a global positioning system ("GPS") application executing on the entity mobile device;
a proximity between the entity mobile device and a Wi-Fi tower identified within a predetermined time window from the date time stamp;
a proximity between the entity mobile device and a cell tower identified within the predetermined time window from the date time stamp;
a proximity between the entity mobile device and other entity mobile devices within a network identified within the predetermined time window from the date time stamp;
a near field communication ("NFC") communication log indicating a communication, within the predetermined time window, between an NFC application, resident on the entity mobile device, and an NFC receiver; and
a Bluetooth® communication log indicating a communication, within the predetermined time window, between a Bluetooth® application, resident on the entity mobile device, and a second Bluetooth® application.

12. The method of claim 11, wherein the plurality of details relating to the linked individual comprise:
an occupation associated with the linked individual;
a set of office hours associated with the linked individual;
a set of mandatory vacation days associated with the linked individual;
one or more geographic office and/or home locations associated with the linked individual; and
a predetermined number of each of a predetermined category of communications transmitted by the individual.

13. The method of claim 12, wherein the predetermined category of communications comprises email, chat, short messaging service ("SMS"), multimedia messaging service ("MMS"), voice call and voice message.

14. The method of claim 11, wherein the set of metadata comprises:
a date time stamp of the communication;
a location of the communication; and
a second communicative party with which the entity mobile device interacted.

15. The method of claim 11, wherein the location of the entity mobile device is identified based on a location of the NFC receiver.

16. The method of claim 11, wherein the location of the entity mobile device is identified based on a location of a device executing the second Bluetooth® application.

17. A communication surveillance system comprising:
a central server; and
a plurality of surveillance applications, each surveillance application included in the plurality of surveillance applications executing on a mobile device included in a plurality of mobile devices, each surveillance application operable to:
detect a plurality of communications occurring on the mobile device; and
for each communication, included in the plurality of communications:
generate a metadata log file for each communication, said metadata log file comprising:
a date time stamp of the communication;
a location of the communication; and
a second communicative party with which the mobile device interacted; and
transmit each metadata log file to the central server;
the central server operable to:
receive a plurality of metadata log files, said plurality of metadata log files comprising each metadata log file generated at each surveillance application, from the plurality of surveillance applications;
receive a set of input parameters; and
generate, using artificial intelligence ("AI"), a baseline to determine anomalous and non-anomalous communications based on the received plurality of metadata log files and the input parameters;
wherein a location of the mobile device is identified based on:
a global positioning system ("GPS") application executing on the mobile device;

a proximity between the mobile device and a Wi-Fi tower identified within a predetermined time window from the date time stamp;

a proximity between the mobile device and a cell tower identified within the predetermined time window from the date time stamp;

a proximity between the mobile device and other mobile devices within a network identified within the predetermined time window from the date time stamp;

a near field communication ("NFC") communication log indicating a communication, within the predetermined time window, between an NFC application, resident on the mobile device, and an NFC receiver; and a Bluetooth® communication log indicating a communication, within the predetermined time window, between a Bluetooth® application, resident on the mobile device, and a second Bluetooth® application.

18. The communication surveillance system of claim 17, the central server further operable to:

continually receive a second plurality metadata log files from the plurality of surveillance applications;

identify each metadata log file, included in the second plurality of metadata log files, as an anomalous communication or as a non-anomalous communication; and update the baseline with the second plurality of metadata log files and with the identification of each metadata log file as an anomalous communication or as a non-anomalous communication.

* * * * *